ically etched, such as polytetrafluoroethylene (PTFE), and

United States Patent [19]
Nelson

[11] Patent Number: 4,744,857
[45] Date of Patent: May 17, 1988

[54] METHOD FOR MODIFYING FLUOROPOLYMER FIBERS

[75] Inventor: Kevin G. Nelson, Pittston, Pa.

[73] Assignee: Acton Associates, Inc., Pittston, Pa.

[21] Appl. No.: 922,159

[22] Filed: Oct. 23, 1986

[51] Int. Cl.$^4$ .................. B44C 1/22; B29C 37/00
[52] U.S. Cl. ..................... 156/637; 156/629; 156/668; 252/79.5; 427/307; 428/236; 428/359; 428/364
[58] Field of Search ............... 156/629, 637, 639, 668; 252/79.5; 427/307; 428/233, 237, 359, 361, 364, 236

[56] References Cited

U.S. PATENT DOCUMENTS

| | | | |
|---|---|---|---|
| 2,789,063 | 10/1957 | Purvis et al. | 117/47 |
| 2,809,130 | 10/1957 | Rappaport | 117/138.8 |
| 3,471,207 | 10/1969 | McCloskey | 156/668 XR |
| 3,516,239 | 6/1970 | Fukuda et al. | 156/668 XR |

OTHER PUBLICATIONS

"Sodium Naphthalene, I. A New Method for the Preparation of Additional Compounds of Alkali Metals and Polycyclic Aromatic Hydrocarbons," by Scott et al, 58. "Fluoropolymer Surface Studies" by Dwight and Riggs, 47 J. Colloid and Interface Science, 650–660 (1974).

Primary Examiner—William A. Powell
Attorney, Agent, or Firm—Richards, Harris, Medlock & Andrews

[57] ABSTRACT

The present invention provides etched fluoropolymer fibers and a method for etching fluoropolymer fibers, which are then capable of being boned either together or with other materials to form composite materials. In particle, the present invention relates to a method for chemically etching chopped, natural polytetrafluoroethylene fiber by immersing the fibers in an alkai metal polyaryl hydrocarbon etching solution with increased temperatures ranging from 50° C. to 110° C. and high shearing agitation until at least 98% of the fibers are sufficiently hydrophilic to sink when placed in water. This produces etched fiber material which may then be bonded together to form composite fluoropolymer products.

8 Claims, No Drawings

METHOD FOR MODIFYING FLUOROPOLYMER FIBERS

TECHNICAL FIELD

The present invention relates to methods for modifying fluoropolymer materials to render them bondable with other materials. In particular, the present invention relates to a method for chemically etching chopped, natural polytetrafluoroethylene fiber.

BACKGROUND ART

Fluorocarbon polymers ("fluoropolymers") are durable thermoplastic substances which are resistant to chemicals, oxidation, moisture, weathering, ozone and ultraviolet radiation. These polymers include polytetrafluoroethylene (PTFE), chlorotrifluoroethylene, fluorinated ethylene-propylene polymers, polyvinylidene fluoride, and hexafluoropropylene among others. Their "non-stick" chemical resistant surfaces have found uses in electrical components, chemical processing equipment, and in coatings for cooking utensils, pipes and gaskets. However, the very characteristic which makes these polymers useful—the "non-stick" surface—also makes the formation of products having a fluoropolymer surface on a different substrate, for example, a fluoropolymer coating on a metal cooking utensil, very difficult since such polymer surfaces cannot be conveniently bonded. Modification of the fluoropolymer surface to render it bondable to other materials is thus required. This is commonly done by etching the surface of the fluoropolymer component before bonding. This "etching" has been performed in the past by reacting the surface with a suitable fluid metal reactant as disclosed in U.S. Pat. No. 2,789,063 to Purvis, et al. The Purvis method replaces fluorine in the surface layer with the metal reactant, making the surface more hydrophilic. Alkali metals, alkaline earth metals, manganese and zinc can be used in the Purvis method to react with fluoropolymer surfaces at high temperature where the metal is a vapor, a metal hydride, or in solution in an amine-type solvent (including liquid ammonia). The systems described by Purvis, et al. are effective but difficult to handle. However, sodium solutions in liquid ammonia are still used today.

The most important chemical etchants used with fluoropolymers employ the solution of a complex of an alkali metal with a polyaryl hydrocarbon solvent such as sodium/naphthalene in dialkyl glycol ether.

All of the above methods have been applied to etching dense, "white" fluoropolymer surfaces. Etching is usually accomplished by dipping the clean fluoropolymer part into the etching solution for a brief time, usually one minute or less, after which it is washed and dried. However, such methods have not been useful for etching fluoropolymer fibers, in particular PTFE fibers, which require, in forming composite materials, a strong particle-matrix bond. PTFE fiber is spun from a viscose rayon matrix containing small particles of PTFE. This fiber is heated to fuse the PTFE and burn out the viscose. The result is a brown, "natural" fiber which has most of the desirable properties of white bleached fiber, including low surface energy (non-stick). Bleaching is a costly procedure, so the "natural" fiber is a less expensive alternative.

However, attempts to etch small diameter chopped, natural fibers by prior art procedures have failed, making difficult the production of durable composite materials using such fibers. Thus, a need exists for a procedure by which such fluoropolymer fibers may be etched and thus rendered bondable.

SUMMARY OF THE INVENTION

The present invention provides etched fluoropolymer fibers and a method for etching fluoropolymer fibers, which are then capable of being bonded either together or with other materials to form composite materials. In one embodiment, the present invention provides etched fluoropolymer fiber having a relatively hydrophilic surface. In another embodiment, the etched fluoropolymer fiber comprises etched, chopped, "natural" PTFE fiber. Such fibers are etched using a method which combines a conventional etching solution with increased temperature and high shearing agitation. In yet another embodiment, the present invention provides fluoropolymer composites improved in their physical characteristics by the use of such etched fibers.

DETAILED DESCRIPTION OF THE INVENTION

Fine fluoropolymer fibers are difficult to etch because they float; even though the specific gravity of such fibers is greater than that of water, the fibers are hydrophobic (resist wetting) and the downward force of gravity cannot overcome the upward force of the surface tension of the liquid solvent. My experimental work to date has involved the DuPont chopped "natural" PTFE fiber referred to herein as "floc". These chopped fibers are preferably about 0.02 mm to about 0.04 mm in diameter and about 0.2 mm to about 0.3 mm in length, having a specific gravity of about 2.1 and a TFE content of about 95%. While the method disclosed below can be used with both "natural" and "white" PTFE fiber of various dimensions, "natural" PTFE fiber is preferred because it is less expensive.

White PTFE deepens in color from tan to black as etching proceeds, making visual observation of the degree of etching possible. However, natural PTFE is brown so that it is difficult to estimate the degree of etching visually. Testing for the degree of etching is done by shaking the etched floc with water and measuring the fraction which sinks. This fraction is hydrophilic and is sufficiently etched. The fraction which floats is still hydrophobic and not sufficiently etched. Preferably at least 98% of the fibers processed will be sufficiently etched (hydrophilic).

It was found that simply stirring the floc into a conventional etching solution was insufficient to etch the floc. Continued experimentation, illustrated by the examples below revealed that a combination of very vigorous agitation and increased temperature was required for good etching. The ingredients of the etching solution used were such as to allow increased temperature without danger. Thus, in the preferred embodiment, about 1.25 to about 2 quarts of etching solution (preferably sodium/naphthalene) is required per pound of floc. The solution should be at a temperature of about 50° C. before agitation. The ingredients should be placed in a high shear mixer at about 50% of the mixer's capacity. After mixing at maximum r.p.m. for 6 to 10 minutes, the treated floc should be rinsed at least twice in boiling water followed by up to four cold water rinses followed by rinsing in acetone, such rinsing being by decantation until the acetone is essentially colorless. At least 98% of the floc so treated is sufficiently hydrophilic to permit the floc to sink in water.

The present invention can be better understood by a study of the following examples which are not intended to limit the subject invention in any manner.

EXAMPLE 1

After a number of trials using various etching conditions of increasing severity, an attempt was made using five pounds of PTFE floc in two gallons of Fluoro Etch (a sodium/naphthalene etching solution) starting at 23° C. The agitator was a "Jiffy" impeller (Model PS) consisting of two 5 inch diameter, two-bladed propellers set 5 inches apart on the same shaft and being pitched in opposition. In addition, two baffles connect the propellers at their periphery and direct the flow into the mixing zone. The agitator, driven at 1200 rpm, created an intense mixing which was continued for 15 minutes. Washing consisted of decantation followed by two water washes and acetone rinsing by decantation until the acetone was essentially colorless (i.e., low in viscose residue) and no naphthalene was visible in the black product. Despite these conditions, the degree of etching was such that only 60% sank in water, so the batch was judged unacceptable.

EXAMPLE 2

A successful etching test was made on a small scale using a kitchen Waring blender driven at maximum speed. In this test ¾ lb of floc was agitated for two minutes with one quart of Fluoro Etch. Although the etchant was at room temperature to start, the heat of reaction plus the mechanical heat raised the temperature to about 100° C. After washing, as in Example 1, the degree of etching was found to allow over 98% of the Teflon particles to sink in water. The success of this small-scale test indicated the need for high-shear mixing and/or increased temperature.

EXAMPLE 3

Based on the success in Example 2, a 45 quart Hobart Blender was acquired. This blender is a bowl-shaped vessel with one baffle. The cutter blade, 10 inches in diameter, is located near the bottom and driven at 1140 r.p.m. by a 5 H.P. motor. When given a 35 quart charge, the degree of etching was such that only 85% of the Teflon powder sank in water. However, upon scaling back to a 10 pound charge of floc with 16 quarts of Fluoro Etch, starting at 50° C. and running for 6 minutes, the etching allowed 98% of the Teflon particles to sink in water. Washing was done as in Example 1. Later the washing procedure was modified to use boiling water to speed the process.

EXAMPLE 4

Composites of etched and unetched PTFE floc in polyurethane were made as follows:

Two batches of a rubbery polyurethane were made with chopped Teflon fiber as a filler; one batch was made from the etched floc and one from unetched floc. Ten grams of the floc were blended into 30 grams of diisocyanate, 60 grams of a poly diol, 20 grams of a triol and a trace of basic catalysts. The polymerization was carried out by heating to 60° C. The Shore hardness of the composite containing unetched PTFE floc was 20 as compared to 60 for the composite with etched PTFE. The increase in hardness illustrates the fact that the bond between the polyurethane matrix and the etched floc fibers was much stronger than was the case for the unetched floc, probably because the hydrophilic sites of the chopped fiber interact with the functional groups of the matrix polymer sufficiently to provide enhanced toughness, durability, and frictional coefficient.

One of ordinary skill in the art, upon reading the above specification and examples, will appreciate that the subject invention can be modified or adapted in a variety of ways. All such modifications or adaptions which fall within the scope of the appended claims are intended to be covered thereby.

I claim:

1. A method of etching fluoropolymer fibers comprising:
   (a) immersing said fibers in an alkali metal/polyaryl hydrocarbon etching solution and;
   (b) subjecting said fibers in said etching solution to high shear agitation which maintains said fibers at a temperature in the range of from about 50° C. to 110° C. until at least 98% of said fibers are sufficiently hydrophilic to sink when placed in water.

2. The method of claim 1 in which said fiber comprises polytetrafluoroethylene.

3. The method of claim 1 wherein said fibers are about 0.02 mm to about 0.04 mm in diameter.

4. The method of claim 1 wherein said fibers are about 0.2 mm to about 0.3 mm in length.

5. The method of claim 1 wherein said fibers have a tetrafluoroethylene content of about 95%.

6. The method of claim 1 wherein said etching solution is a sodium/napathalene etching solution.

7. The method of claim 1 wherein said high shear agitation is accomplished by intense mechanical mixing using a high shear mixer.

8. The method of claim 1 wherein said high shear agitiation is maintained for 6 to 10 minutes.

* * * * *

UNITED STATES PATENT AND TRADEMARK OFFICE
CERTIFICATE OF CORRECTION

PATENT NO. : 4,744,857

DATED : May 17, 1988

INVENTOR(S) : Kevin G. Nelson

It is certified that error appears in the above-identified patent and that said Letters Patent is hereby corrected as shown below:

In the ABSTRACT: (4th line) change "In particle," to --In particular,--
In the ABSTRACT: (7th line) change "alkai" to --alkali--

Signed and Sealed this

Third Day of January, 1989

Attest:

DONALD J. QUIGG

*Attesting Officer*  *Commissioner of Patents and Trademarks*